UNITED STATES PATENT OFFICE 2,275,957

PROCESS FOR COATING AND LAMINATING MATERIALS

Frazier Groff, Lakewood, Ohio, assignor to Carbide and Carbon Chemicals Corporation, a corporation of New York No Drawing. Application February 11, 1938, Serial No. 190,035

17 Claims. (Cl. 154—2)

This invention pertains to a novel and economical method of forming thin sheets from vinyl resins and it includes an improved method of coating fibrous and cellular materials with vinyl resin compositions.

Various methods of coating fibrous and cellular materials with vinyl resins have been proposed. For example, it has been suggested that the resinous coating composition be dissolved in an appropriate solvent and applied directly to the material, and the solvent removed by drying. This process results in considerable impregnation of the material which may or may not be desirable. For many purposes it would be advantageous to coat the material with a preformed film of vinyl resin. In this manner, coatings of any desired thickness or degree of impregnation may readily be obtained. Reissue 20,080 of Patent 2,010,963 to Robertson describes the manufacture of films from vinyl resins by continuous extrusion of a solution of the resin into a precipitating bath followed by removal of the solvents and nonsolvents from the film by drying. This patent points out that formation of thin plasticized films by calendering the resin between heated rolls is unsatisfactory. However, formation of vinyl resin films by calendering, if feasible, would be most desirable from an economic viewpoint, since the expensive solvents, drying equipment, and solvent recovery and separation systems of the previously proposed processes are not required.

Unfortunately, present processes of forming plasticized films from vinyl resins by calendering yield an unsatisfactory product. It is necessary to incorporate plasticizers or other softening agents in a vinyl resin film intended for use as a coating to render the film sufficiently flexible for handling and to make the coating pliable and extensible. Plasticized vinyl resin compounds containing the desired amount of plasticizer, approximately 15% or more, are extremely plastic at the desired calendering temperature, namely the temperature at which films free from internal strains on cooling are formed. The films formed tend to stick to the rolls and become badly distorted and stretched under the tension required to remove them from the rolls.

Calendering the resin at lower temperatures does not obviate the above difficulties. Films calendered at lower temperatures possess internal strains and will distort on heating. In addition, under the tension required for reeling and slitting operations, the vinyl resin film produced by the previously known calendering processes is stretched. This makes the film non-uniform in width and thickness, and necessitates trimming for satisfactory packaging. For these reasons it is impossible to produce plasticized vinyl resin films at the high calender speeds which are economically desirable. Further disadvantages of the plasticized vinyl resin films produced heretofore are that the rolls of film become tacky, unsightly, and difficult to unwind when stored at summer temperatures.

One of the objects of this invention is to produce at high calender speeds a vinyl resin film which will be dimensionally uniform. A further object is to provide a novel and efficient method of coating fibrous and cellular materials. Another object is to protect and enhance the appearance of material containing designs or printed matter by coating the surface with a preformed film of vinyl resin.

If the plasticized vinyl resin film is carefully formed on the surface of an appropriate paper as a carrier, I have found that, contrary to all expectations and the teachings of the prior art, only a superficial and easily frangible bond is formed between the paper and the vinyl resin film when cool. The preferred carrier materials for this invention are papers of the glassine type which are gelatinized, hydrated papers having a smooth, non-porous surface. A preferred grade is the paper known to the trade as glassine, although other papers similar to it may be used.

The film is formed on the surface of the paper by passing the resin composition and the glassine paper concomitantly through the rolls of a calendering machine. The rolls are preferably steam-heated although electrical heating is equally satisfactory. Temperatures sufficiently high (from about 120° to about 140° C.) are used so that strain-free films are formed and yet the composition does not stick to the rolls at these high temperatures. Any desired film thickness (0.001 to 0.01 inches) may be obtained by adjusting the opening between the rolls. The vinyl resin film may be easily and continuously removed to form a separate roll of film and a separate roll of glassine paper, or the glassine paper may be left attached to provide superior packaging qualities.

Adequate lubrication of the calender rolls is necessary for the successful practice of this invention to cause the resin film to adhere more firmly to the glassine paper than to the calender rolls, and to minimize the pulling force required to remove from the rolls the coated glassine paper which is mechanically weak while hot. Satisfactory lubricants are metallic soaps and waxes, such as calcium stearate, lead stearate, butyl stearate, carnauba and paraffin wax. Mixtures of metallic stearates with waxes are preferred. The lubricants may be incorporated in the coating composition, and they preferably constitute from about 2% to about 4% of the total.

The use of the carrier material described above permits production of the film at high calender speeds of around 80 linear feet per minute, or higher, and prevents stretching and distorting of the film in reeling and slitting operations. A superior product of uniform width and thickness is obtained. The layer of glassine paper prevents sticking of the film layers on storage, and facilitates handling of the film in processing operations.

The presence of the carrier material provides unusual advantages in coating fibrous and cellular materials. The vinyl resin film shows preferential adhesion to more porous papers, cork, cloth, and like substances, rather than to the glassine paper. Such materials may be readily coated by placing them in juxtaposition to the resin-coated side of the glassine paper, subjecting the assembly to heat and pressure, cooling and stripping off the readily removable glassine paper. The resin film adheres strongly to the surface of the coated material and has a matte and dull finish corresponding to that of the glassine paper.

If a glossy surface is desired, I have found that a brief exposure to heat at temperatures from about 125° to about 150° C. will flux the vinyl resin film to form a glossy or glazed surface. If printing is inscribed on the dull resinous surface before glazing, I have found that the printing matter is permanently set in the vinyl resin surface after glazing and will not rub off. The vinyl resin film when glazed in this manner protects and enhances the appearance and feel of the coated material.

A plurality of articles may be coated in one operation by the glassine paper and vinyl resin composite, the glassine paper separating successive layers. After removal from the press and cooling, the glassine paper is easily removed. The glassine paper also prevents the thermoplastic vinyl resin composition from coming in contact with the hot processing equipment.

If greater impregnation of the coated article is desired, it is only necessary in the glazing operation to subject the coated article to a greater degree of heat or to maintain the article at the glazing temperature for a longer period. For instance, a sateen fabric was transfer-coated by the above process, and samples of this coated fabric were glazed for one minute at temperatures of about 105°, 111°, 131°, 144°, and 150° C., respectively. The degree of impregnation in each instance was in direct proportion to the glazing temperature.

Fibrous and cellular materials when coated by the above process are impervious to grease, moisture, and many organic solvents. This process is especially adapted for increasing the attractiveness and durability of advertising matter, labels and the like by giving them a protective finish with a high gloss.

If desired, a preformed vinyl resin film may be hot pressed upon the glassine paper to form a composite product having the same desirable properties.

The vinyl resins used in the preferred embodiment of this invention are those which result from the conjoint polymerization of a vinyl halide and a vinyl ester of an aliphatic acid and which contain from about 70% to about 95% vinyl halide. Particularly desirable are those vinyl resins which result from the conjoint polymerization of vinyl chloride and vinyl acetate which contain about 80% to about 90% vinyl chloride, and which possess an average molecular weight of from about 9,000 to about 13,000. The average molecular weight may be defined as the product of the average number of monomeric units in the macromolecule and the theoretical unit monomeric molecular weight computed from the ratio of vinyl chloride to vinyl acetate. It is to be understood that, because of assumptions made in the determination of the molecular weight of these resins, the above values may be relative and not necessarily absolute. The molecular weight of these resins was determined from the specific viscosity of dilute solutions according to Staudinger's method. Other vinyl resins may be used such as the polymers of vinyl benzene, vinyl chloride, and vinyl acetate, and some of the vinyl acetal resins.

The coating process described above is particularly adapted to the use of coating compositions containing from about 10% to about 25% plasticizer. Obviously much more highly and much less highly plasticized compositions may be used depending on the type of coating required, the degree of polymerization of the vinyl polymer, and the particular plasticizer used. Satisfactory plasticizers for vinyl resins are high-boiling, stable esters, such as di(beta-butoxy ethyl) phthalate, tricresyl phosphate, dibutylphthalate, triglycol dihexoate, methyl phthalyl ethyl glycollate, and dibutyl sebacate.

The following examples illustrate methods of applying this invention:

*Example 1*

A vinyl resin coating of the following composition was prepared:

| | Parts by weight |
|---|---|
| Vinyl resin | 80.6 |
| Di(beta-butoxy ethyl) phthalate | 17.0 |
| Carnauba wax | 1.3 |
| Calcium stearate | 0.8 |
| Hydrated lime | 0.3 |

The resin used was that resulting from the conjoint polymerization of vinyl chloride and vinyl acetate containing about 87% vinyl chloride and having an average molecular weight of about 10,000.

A film of this composition, 0.0013 inch thick, was calender-coated upon a roll of glassine paper 40 inches wide and weighing 25 pounds per ream. The calender used was a standard 4-roll machine. The temperature of the calender rolls was 134° to 142° C. and the coating speed was 84 linear feet per minute. No difficulty was encountered in slitting this paper into sections ten inches in width and the composite product was of excellent appearance. The adhesion of the vinyl resin film to the glassine paper was found to be superficial and the two layers were easily and continuously separated. The film was heated to around 125° C. for a brief period and no distortion occurred, showing the film to be free from internal strains. The coated glassine paper was very easy to handle and to trim and no difficulty was experienced from crinkling.

It was found that the vinyl resin film could be easily transferred from the glassine coated paper to other surfaces, such as that of pressboard. The coated side of the glassine paper was placed next to the surface of the pressboard and moderate heat and pressure were applied for approximately two minutes by means of a hydraulic press equipped with steam-heated platens. After removal of the composite product from the press and cooling the glassine paper was easily stripped off. The pressboard was left coated with a vinyl resin film, the surface of which was dull because of the retention of slight amounts of cellulose and reproduction of the surface of the glassine paper. It was found that, when the pressboard was heated to around 130° C., the vinyl resin coating became glossy.

*Example 2*

A vinyl resin coating of the following composition was prepared:

|  | Parts by weight |
|---|---|
| Vinyl resin | 77.28 |
| Di(beta-butoxy ethyl) phthalate | 20.59 |
| Carnauba wax | 1.30 |
| Calcium stearate | 0.77 |
| Hydrated lime | 0.30 |
| Basic carbonate white lead | 0.38 |
| Titanium dioxide | 1.00 |
| Ultramarine blue | 0.034 |

The vinyl resin used was that resulting from the conjoint polymerization of vinyl chloride and vinyl acetate containing about 87% vinyl chloride and having an average molecular weight of about 12,500.

A film of this composition, approximately 0.002 inch thick, was calender-coated upon a part roll of 40-inch wide glassine paper. The temperature of the calender rolls was 134° to 142° C. and the coating speed was 84 linear feet per minute. A standard 4-roll machine was used. The product was similar in properties to the resin-coated glassine paper produced in Example 1.

The above composition contains about the minimum amount of lubricant desirable for satisfactory operation. Under the conditions set forth, compositions containing less lubricant adhered sufficiently to the rolls to tear the glassine paper. The above example shows that vinyl resins of higher molecular weight may be used satisfactorily if slightly more plasticizer is added.

*Example 3*

Films having the composition described in Example 1 were calender-coated upon rolls of glassine paper 40 inches wide and weighing 25 pounds per ream. Coating operations were similar to those described in Example 1 but the films were 0.002, 0.003, and 0.005 inch thick, respectively. Films of any desired thickness up to about 0.01 inch may be readily obtained by this process.

*Example 4*

Twelve sheets of pulpboard, 0.020 inch in thickness, were assembled with 12 sheets of the coated glassine paper prepared as described in Example 1, the coated surface of the glassine paper being in each instance next to the pulpboard. The assembly was pressed for 10 minutes in a hydraulic press at a temperature of around 105° C. and a pressure of about 250 pounds per square inch on the surface of the material. The press was opened without cooling and the composites allowed to cool in air. The glassine paper was easily removed from the sheets leaving the pulpboard coated with a vinyl resin film having a dull and matte finish. The coated sheets were placed with the coated side up on a metallic surface at a temperature of about 150° C. where they remained for 90 seconds. During this time the surface of the vinyl resin coating fluxed slightly and became glossy. Similar results were obtained by briefly immersing the coated but unglazed pulpboard in mercury at 130° to 135° C.

On some of the composites described, printing was inscribed on the surface of the coated but unglazed pulpboard and the sheet glazed by subjecting it to radiant heat. It was found that the printing was set in the vinyl resin surface and was not removed on washing.

In a similar manner muslin and heavy sateen were coated with the vinyl film and the coating glazed.

*Example 5*

Fabricated cork board was superposed with the coated glassine paper prepared as described in Example 1 and subjected to heat and pressure in a press. The composite was removed from the press while hot, allowed to cool in air and the glassine paper stripped off. The vinyl resin film was well bonded to the cork. The resistance of the cork board, when treated in this manner, to light petroleum distillates was considerably greater than may be obtained by direct calendering or pressing of the film onto the cork.

*Example 6*

A 10-yard length of the coated glassine paper and a 10-yard length of kraft paper were superposed and then tightly wrapped on a paper core. This roll was placed in an oven at 120° C. for 15 minutes and then removed and allowed to cool. It was found that the vinyl resin film was effectively transferred to the kraft paper when the glassine paper was removed.

*Example 7*

A 10-yard length of coated glassine paper prepared as described in Example 1 and an equal length of white sulphite calendered paper were superposed with the coated surface of the glassine next to the paper. The assembly was slowly drawn over a heated roll. After cooling, the glassine paper was stripped off leaving the paper coated with a vinyl resin coating. The coating was glazed and further bonded to the paper by passing the paper, with the coated side up, over a heated roll.

*Example 8*

A dozen sheets of white sulphite calendered paper, 12x12x0.003 inches, were superposed with a dozen sheets of the coated glassine paper prepared as described in Example 1. The assembly was placed in a press and subjected to a pressure of 250 pounds per square inch on the material and a temperature of about 105° C. for a short time. The pressed sheets were removed from the press while hot, allowed to cool in air and the glassine was then stripped off. The coated paper was glazed by a few seconds exposure to radiant heat.

In this manner a plurality of sheets may be coated in one operation in a single press. The bulky metallic press plates heretofore required to keep the layers separate are eliminated with a consequent increase in the unit capacity of the press.

Example 9

Five sheets of colored labels were coated with the vinyl resin film prepared as described in Example 1 by hot pressing, removal of the glassine paper, and glazing. The glazing operation was accomplished by placing the coated labels on a metallic surface at a temperature of about 145° C. for 30 seconds. Approximately 75 sheets of advertising matter were coated in like manner by a single press operation. The sheets were glazed by passing them, one at a time, between two metallic surfaces at a temperature of around 150° C. and spaced about one-half inch apart.

The finished sheets were of excellent appearance and high gloss, indicating that the hereindescribed processes are well adapted for applying a glossy and impervious coating to magazine covers, labels, advertising matter, and other articles.

Example 10

A semi-continuous process of coating materials by means of the vinyl resin and glassine paper composite may be practiced. A roll of the glassine paper coated with the vinyl resin and a roll of very open tissue-like paper were arranged so that a continuous sheet of the glassine composite could be superposed upon a continuous sheet of the paper with the coated side of the glassine adjacent to the paper. The assembly was intermittently drawn over the platen of a diaphragm press heated to about 95° C. Each section was pressed for about 15 seconds using 80 pounds per square inch air pressure. The glassine was stripped from the coated paper to form a separate roll. The duration of the pressing operation may be considerably less than 15 seconds and may even be as low as one second if equipment of suitable speed is employed.

This invention is not limited to the specific temperatures, pressures, heating times, or coating compositions described in the foregoing examples as modifications of these to achieve the objects of this invention will be readily apparent to those skilled in the art.

I claim:

1. A composite product consisting of a film of a vinyl resin superficially bonded by the application of heat and pressure to a paper which has a dense and substantially non-porous surface, the bond between said film of vinyl resin and said paper being easily frangible at ordinary temperatures without detriment to either the vinyl resin film or the paper.

2. A composite product consisting of a film of a vinyl resin superficially bonded to a paper which has a dense and substantially non-porous surface, the bond between said film of vinyl resin and said paper being easily frangible at ordinary temperatures without detriment to either the vinyl resin film or the paper whereby said film is adapted for transfer as a coating to fibrous and cellular materials.

3. A composite product consisting of a film of a vinyl resin superficially bonded to glassine paper, the bond between said film of vinyl resin and said paper being easily frangible at ordinary temperatures without detriment to either the vinyl resin film or the paper whereby said film is adapted for transfer as a coating to fibrous and cellular materials.

4. A composite product consisting of a film of a vinyl resin, substantially identical with that resulting from the conjoint polymerization of a vinyl halide and a vinyl ester of an aliphatic acid, superficially bonded to a gelatinized and hydrated paper, the bond between said film of vinyl resin and said paper being easily frangible at ordinary temperatures without detriment to either the vinyl resin film or the paper whereby said film is adapted for transfer as a coating to fibrous and cellular materials.

5. A composite product consisting of a plasticized film of a vinyl resin, substantially identical with that resulting from the conjoint polymerization of vinyl chloride with vinyl acetate and containing from about 80% to about 90% combined vinyl chloride, superficially bonded to glassine paper, the bond between said film of vinyl resin and said paper being easily frangible at ordinary temperatures without detriment to either the vinyl resin film or the paper whereby said film is adapted for transfer as a coating to fibrous and cellular materials.

6. A process for making a composite product consisting of a plasticized film of a vinyl resin superficially bonded to a gelatinized and hydrated paper, which comprises calendering at elevated temperatures a resinous composition consisting of a vinyl resin, plasticizer therefor, and a lubricant onto the paper; the union obtained being non-permanent and easily frangible at ordinary temperatures without detriment to either the vinyl resin film or the paper.

7. A process for making a composite product consisting of a plasticized film of a vinyl resin, such resin being substantially identical with that resulting from the conjoint polymerization of a vinyl halide and a vinyl ester of an aliphatic acid, superficially bonded to glassine paper, which comprises calendering at elevated temperatures a resinous composition consisting of said vinyl resin, plasticizer therefor, and a lubricant onto the glassine paper; the union obtained being non-permanent and easily frangible at ordinary temperatures without detriment to either the vinyl resin film or the glassine paper.

8. A process for making a composite product consisting of a plasticized film of a vinyl resin, such resin being substantially identical with that resulting from the conjoint polymerization of vinyl chloride and vinyl acetate, superficially bonded to glassine paper, which comprises calendering at elevated temperatures a resinous composition consisting of said vinyl resin, plasticizer therefor, and a lubricant onto the glassine paper; the union obtained being non-permanent and easily frangible at ordinary temperatures without detriment to either the vinyl resin film or the glassine paper.

9. A process for making a composite product consisting of a plasticized film of a vinyl resin, such resin being substantially identical with that resulting from the conjoint polymerization of vinyl chloride and vinyl acetate and containing from about 80% to about 90% vinyl chloride, superficially bonded to glassine paper, which comprises calendering, at a calender roll temperature of about 110° to about 145° C., a resinous composition consisting of said vinyl resin, plasticizer therefor, and a lubricant onto the glassine paper; the union obtained being non-permanent and easily frangible at ordinary temperatures without detriment to either the vinyl resin film or the glassine paper.

10. A process for making a dimensionally uniform vinyl resin film which comprises calendering, at temperatures sufficiently high to form strain-free films which do not adhere to the calender rolls, a resinous composition consisting of a vinyl resin, plasticizer therefor, and a lubricant onto a gelatinized and hydrated paper; the bond obtained being non-permanent and easily frangible at ordinary temperatures, and removing the vinyl resin film from the paper.

11. A process for making a dimensionally uniform vinyl resin film, such resin being substantially identical with that resulting from the conjoint polymerization of a vinyl halide and a vinyl ester of an aliphatic acid, which comprises calendering, at temperatures sufficiently high to form strain-free films which do not adhere to the calender rolls, a resinous composition consisting of said vinyl resin, plasticizer therefor, and a lubricant onto glassine paper; the bond obtained being non-permanent and easily frangible at ordinary temperatures, and removing the vinyl resin film from the glassine paper.

12. A process for making a dimensionally uniform vinyl resin film, such resin being substantially identical with that resulting from the conjoint polymerization of vinyl chloride and vinyl acetate and containing from about 80% to about 90% vinyl chloride, which comprises calendering, at a temperature of about 110° to about 145° C., a resinous composition consisting of said vinyl resin, plasticizer therefor, and a lubricant onto glassine paper; the bond obtained being non-permanent and easily frangible at ordinary temperatures, and removing the vinyl resin film from the glassine paper.

13. A process for coating fibrous and cellular materials which comprises placing the material in juxtaposition to the resin-coated side of a composite product consisting of a film of a vinyl resin composition bonded to a paper which has a dense and substantially non-porous surface, said bond being non-permanent and easily frangible at ordinary temperatures, subjecting the assembly to pressure and sufficient heat to soften but not to melt the vinyl resin, transferring the entire vinyl resin film to the material being coated by means of its preferential adhesion thereto, and removing the paper from the coated material.

14. A process for coating fibrous and cellular materials which comprises placing the material in juxtaposition to the resin-coated side of a composite product consisting of a film of a vinyl resin composition bonded to glassine paper, said bond being non-permanent and easily frangible at ordinary temperatures, subjecting the assembly to pressure and sufficient heat to soften but not to melt the vinyl resin, transferring the entire vinyl resin film to the material being coated by means of its preferential adhesion thereto, and removing the glassine paper from the coated material.

15. A process for coating fibrous and cellular materials which comprises placing the material in juxtaposition to the resin-coated side of a composite product consisting of a film of a vinyl resin composition, said resin being substantially identical with that resulting from the conjoint polymerization of a vinyl halide and a vinyl ester of an aliphatic acid, bonded to glassine paper, said bond being non-permanent and easily frangible at ordinary temperatures, subjecting the assembly to pressure and sufficient heat to soften but not to melt the vinyl resin and transferring the entire vinyl resin film to the material being coated by means of its preferential adhesion thereto, and removing the glassine paper from the coated material.

16. A process for coating fibrous and cellular materials which comprises placing the material in juxtaposition to the resin-coated side of a composite product consisting of a film of a vinyl resin composition, said resin being substantially identical with that resulting from the conjoint polymerization of vinyl chloride and vinyl acetate and containing from about 80% to about 90% vinyl chloride, bonded to glassine paper, said bond being non-permanent and easily frangible at ordinary temperatures, subjecting the assembly to pressure and sufficient heat to soften but not to melt the vinyl resin, and transferring the entire vinyl resin film to the material being coated by means of its preferential adhesion thereto and removing the glassine paper from the coated material.

17. A process for coating fibrous and cellular materials which comprises placing the material in juxtaposition to the resin-coated side of a composite product consisting of a plasticized film of a vinyl resin, said resin being substantially identical with that resulting from the conjoint polymerization of vinyl chloride and vinyl acetate and containing from about 80% to about 90% vinyl chloride, bonded to glassine paper, said bond being non-permanent and easily frangible at ordinary temperatures, subjecting the assembly to heat at temperatures of about 90° to about 150° C. and to pressures of about 20 to about 500 pounds per square inch, and transferring the entire vinyl resin film to the material being coated removing the glassine paper from the coated material, and glazing or fusing the resin-coated surface by a brief exposure to heat at temperatures of about 105° to about 150° C.

FRAZIER GROFF.